United States Patent
Andersen et al.

(10) Patent No.: US 11,941,128 B2
(45) Date of Patent: Mar. 26, 2024

(54) INDIRECT DIAGNOSIS OF MULTIPLE FLUID MIXER UNIT PERFORMANCE

(71) Applicant: SCHLUMBERGER TECHNOLOGY CORPORATION, Sugar Land, TX (US)

(72) Inventors: Simon Ivar Andersen, Hvidovre (DK); Sharath Chandra Mahavadi, Lexington, MA (US); Salim Taoutaou, Clamart (FR); Alexander Nebesnyy, Kuala Lumpur (MY); Jonathan Wun Shiung Chong, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 754 days.

(21) Appl. No.: 16/499,114

(22) PCT Filed: Mar. 28, 2018

(86) PCT No.: PCT/US2018/024920
§ 371 (c)(1),
(2) Date: Sep. 27, 2019

(87) PCT Pub. No.: WO2018/183555
PCT Pub. Date: Oct. 4, 2018

(65) Prior Publication Data
US 2021/0086400 A1 Mar. 25, 2021

Related U.S. Application Data

(60) Provisional application No. 62/477,818, filed on Mar. 28, 2017.

(51) Int. Cl.
*B28C 7/02* (2006.01)
*B28C 7/04* (2006.01)
(Continued)

(52) U.S. Cl.
CPC ............ *G06F 21/575* (2013.01); *B28C 7/024* (2013.01); *B28C 7/0418* (2013.01);
(Continued)

(58) Field of Classification Search
CPC .... B28C 7/024; B28C 7/0418; G01N 27/447; E21B 33/14
See application file for complete search history.

(56) References Cited

U.S. PATENT DOCUMENTS

| | | |
|---|---|---|
| 5,590,958 A | 1/1997 | Dearing, Sr. et al. |
| 5,653,533 A | 8/1997 | Green |

(Continued)

FOREIGN PATENT DOCUMENTS

| | | |
|---|---|---|
| EP | 3051057 A1 | 8/2016 |
| WO | 2018081506 A1 | 5/2018 |

OTHER PUBLICATIONS

Cob, "Improved Analysis Techniques Quantitatively Determine Critical Organic Additives Simultaneously in Cement Blends", Petroleum Society of CIM, Paper No. 86-37-48, 1986, pp. 95-100.

*Primary Examiner* — Elizabeth Insler
(74) *Attorney, Agent, or Firm* — Jeffrey D. Frantz

(57) ABSTRACT

A liquid additive mixing apparatus is provided that has a plurality of chambers containing additives, as well as a system for mixing the additives. One or more additives are mixed with water to form a mixing fluid. The mixing fluid is placed in a first tank that is fluidly connected to a cement mixing unit. A cementing operation is executed during which the mixing fluid from the first tank is mixed with a cement to form a slurry. A capillary electrophoresis (CE) instrument is employed to monitor at least one additive parameter and detect deviations from a predetermined tolerance for the at least one additive parameter.

18 Claims, 3 Drawing Sheets

(51) Int. Cl.
    *G01N 27/447*     (2006.01)
    *G06F 21/57*     (2013.01)
    *H04L 9/08*     (2006.01)
    *H04L 9/32*     (2006.01)
    *E21B 33/13*     (2006.01)
    *H04L 9/40*     (2022.01)

(52) U.S. Cl.
    CPC ..... *G01N 27/44791* (2013.01); *H04L 9/0825* (2013.01); *H04L 9/0861* (2013.01); *H04L 9/0891* (2013.01); *H04L 9/321* (2013.01); *H04L 9/3247* (2013.01); *H04L 9/3263* (2013.01); *H04L 9/3268* (2013.01); *H04L 9/3297* (2013.01); *E21B 33/13* (2013.01); *H04L 63/08* (2013.01); *H04L 63/0823* (2013.01); *H04L 2463/121* (2013.01)

(56) References Cited

U.S. PATENT DOCUMENTS

| | | | |
|---|---|---|---|
| 7,677,786 B2 * | 3/2010 | Uno | B28C 5/003 |
| | | | 106/710 |
| 2010/0246312 A1 * | 9/2010 | Welker | B01F 35/2215 |
| | | | 366/4 |
| 2011/0127034 A1 | 6/2011 | Vidick et al. | |
| 2015/0114837 A1 | 4/2015 | Mahavadi et al. | |
| 2017/0045476 A1 * | 2/2017 | Mahavadi | G01N 27/44743 |

* cited by examiner

INDIRECT DIAGNOSIS OF MULTIPLE FLUID MIXER UNIT PERFORMANCE

CROSS-REFERENCE TO RELATED APPLICATION

This application is a Nonprovisional application that is the National Stage Entry of International Application No. PCT/US2018/024920, filed on Mar. 28, 2018, which claims the benefit of U.S. Provisional Application No. 62/477,818, filed on Mar. 28, 2017, entitled "Indirect Diagnosis of Multiple Fluid Mixer Unit Performance."

BACKGROUND

In the oilfield industry, different fluids may be injected in subterranean zones. For example, drilling a well requires the use of a mud. Well cementing or plugging may require pumping chemical washes, spacer fluids and settable compositions (e.g., cement slurry, resin, and geopolymer) to ensure proper hydraulic isolation of the annulus between the casing and the formation, or to repair or plug the well. Once a well is able to produce, completion fluids may be required. Production may be improved during acidizing or fracturing operations. Sand control may also be achieved by injecting optimized fluids containing sand. These examples are illustrative and do not limit the types of fluids that may be pumped into subterranean wells.

For each of the examples listed above, fluid property optimization takes place based on well configuration (temperature, pressure, deviation, etc.) and client requirements. For example, in a cement slurry, a retarder concentration may be adjusted to allow fluid placement in the annulus, yet minimize waiting on cement time.

When a cement slurry is placed across a permeable formation under pressure, a filtration process occurs. The aqueous phase of the slurry may escape into the formation, leaving the cement particles behind. Such a process is commonly known as fluid loss. If fluid loss is not controlled, several serious consequences may result that can lead to cement-job failure. The concentration of the fluid loss additive is dictated by not only the well configuration (temperature, slurry density, slurry volume fraction, etc.), but also the fluid-loss rate that is tolerable given the nature of the formations with which the cement slurry comes into contact (e.g., porosity and permeability). Other additives include gelling agents to control the fluid's rheological properties, retarders and accelerators to control the setting properties of cement, anti-settling agents, extenders, etc. Prior to a cementing operation, these fluids are optimized in a laboratory following API recommended practices or standards and with all chemicals (including water) used for the job. At a laboratory scale, it is easy to prepare accurately the mixed fluid by weighing each liquid additive and blending them with water.

Good quality assurance is desirable to achieve proper placement, avoid premature setting or misplacement of the cement. Such techniques include Capillary Electrophoresis (CE) and other techniques, as will be appreciated by those skilled in the art.

SUMMARY

The present disclosure is directed to methods and processes for real-time performance monitoring of additive mixing equipment employed in well-service operations. The blend composition is analyzed in real time at constant mixing settings. This technique provides auto fault detection and, suggests or predicts specific subunit failures. Little to no human intervention is required.

In an aspect, methods are disclosed for performing a cementing operation at a wellsite. A liquid additive mixing apparatus is provided that comprises a plurality of chambers containing additives, and further comprises a system for mixing the additives. At least one additive is mixed with water to form a mixing fluid. The mixing fluid is placed in a first tank that is fluidly connected to a cement mixing unit. A cementing operation is executed during which the mixing fluid from the first tank is mixed with the cement to form a slurry. A capillary electrophoresis (CE) instrument is used to monitor the at least one additive parameter and detect deviations from a predetermined tolerance for the at least one additive parameter. If deviations are detected, corrective action is taken to return the at least one additive parameter to the predetermined tolerance.

In a further aspect, methods are disclosed for monitoring at least one parameter pertaining to a cementing operation. A liquid additive mixing apparatus is provided that comprises a plurality of chambers containing additives, and further comprises a system for mixing the additives. The at least one additive is mixed with water to form a mixing fluid. The mixing fluid is placed in a first tank that is fluidly connected to a cement mixing unit. A cementing operation is executed during which the mixing fluid from the first tank is mixed with the cement to form a slurry. As the A capillary electrophoresis (CE) instrument is used to monitor at least one additive parameter and detect deviations from a predetermined tolerance for the at least one additive parameter.

In yet a further aspect, systems for performing a cementing operation are disclosed. The system comprises a liquid additive system that comprises a plurality of chambers containing additives, and further comprises a system for mixing the additives and forming a mixing fluid. The system further comprises first and second tanks that are fluidly connected to a cement mixing unit, and a capillary electrophoresis (CE) instrument.

DETAILED DESCRIPTION

Figure 1:
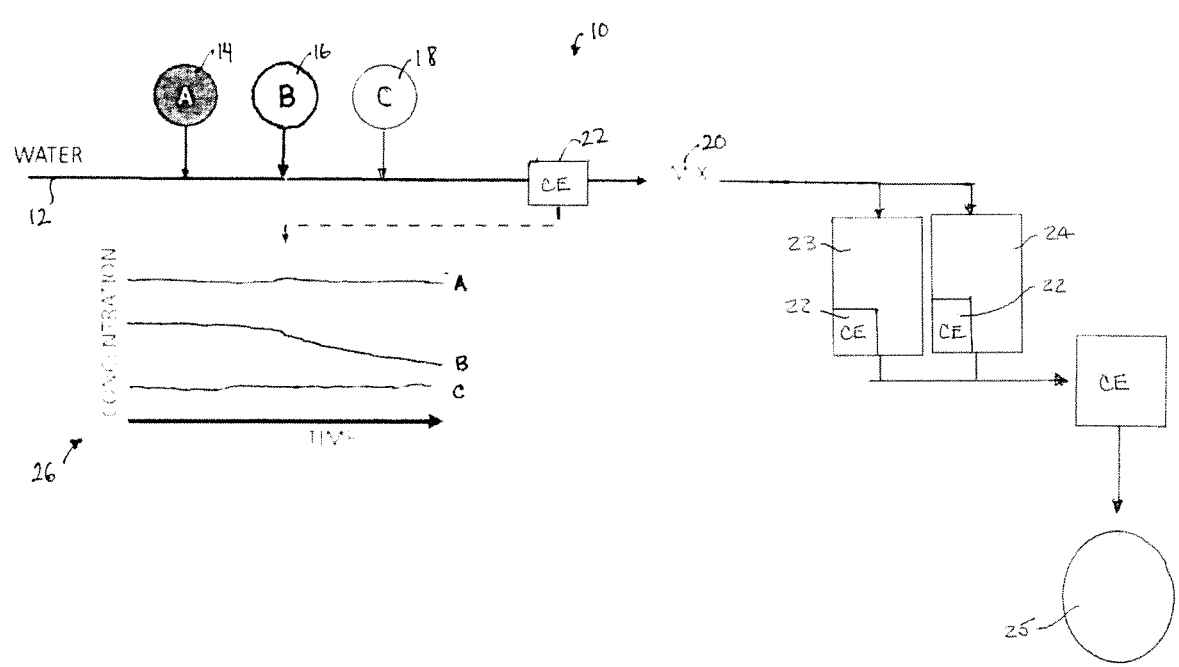
FIG. 1 is a schematic diagram of the liquid additive mixing system of the disclosure.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation—specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

The present disclosure is directed to using the previously discussed capillary electrophoresis (CE) methodology for in-situ and quasi real-time analysis of a fluid while it is being pumped into subterranean zones.

Embodiments of the present disclosure are directed to uses of CE techniques to monitor the cementing process.

CE is highly sensitive and easy to operate. A CE unit can be miniaturized and accommodated into a well site laboratory or onto field equipment. CE has major advantages which are not limited to the following: 1) one single technique for the analysis of different types of additives; 2) potentially one single method can be used to analyze all types of ions; 3) use of specific components in individual additives to monitor concentration; 4) minimal to no sample preparation. Samples can be injected straight without pretreatment; 5) easy to operate; 6) the proposed technology can be deployed to field to perform onsite analyses.

A liquid additive mixing apparatus is provided that comprises a plurality of chambers containing additives, and further comprises a system for mixing the additives. The additives are mixed with water to form a mixing fluid. The mixing fluid is placed in a first tank that is fluidly connected to a cement mixing unit. A cementing operation is executed during which the mixing fluid from the first tank is mixed with the cement to form a slurry. A capillary electrophoresis (CE) instrument is used to monitor at least one additive parameter and detect deviations from a predetermined tolerance for the at least one additive parameter. If deviations are detected, corrective action is taken to return the at least one additive parameter to the predetermined tolerance. CE units may be positioned at various locations. This procedure may be performed continuously.

Mixing fluid may be prepared continuously during mixing using the liquid additive mixing apparatus, and the entire cementing operation may be continuous. Or, the mixing fluid preparation may be performed in separate batches. For example, as mixing fluid from the first tank is being used to mix the cement slurry, newly prepared mixing fluid may be added to a second tank that is fluidly connected to the cement mixing unit. When the mixing fluid in the first tank is exhausted, mixing fluid from the second tank is then pumped to the cement mixing unit. While the mixing fluid from the second tank is being used to mix the cement slurry, newly prepared mixing fluid may be added to the first tank. This alternating procedure may proceed until the cementing operation is complete.

In an embodiment, the additives may be injected automatically in a water stream that is then used promptly to prepare the cement slurry or another type of fluid. The cement slurries may be employed in either primary or remedial cementing operations. Other types of fluids may be prepared by this system include chemical washes, spacer fluids, gravel packing fluids, acidizing fluids, fracturing fluids and pills.

Based on the significance of each additive on the well fluid properties, it may be decided to determine the concentration of all additives or only one or a limited number of the additives present in the fluid, and the concentrations can be adjusted as needed to reach the desired target concentration(s). Though CE offers simple measurements or technique to analyze different chemistries of cement additives, some time may be required for the operator to determine the quality of the individual additives, final mix-fluid and slurry quality.

Additives which can be analyzed by the CE technique may contain at least one component soluble in the solvent of interest. This automated QA/QC of additives can be used in various fluids, which are not limited to drilling fluids, spacer, settable composition (including cement and resins), completion fluid, acidification fluids, fracturing fluid, sand control fluids, or any other fluids which needs to be pumped in subterranean zones. They can act as anti-foamer, defoamer, dispersant, accelerator, retarder, fluid loss additives, gas migration additives, corrosion inhibitors, acids, gelling agent, cross-linkers, breakers, surfactants, ions, etc. Other additives not listed here but that are within the understanding of one of ordinary skill in the art are considered part of this disclosure.

FIG. 1 is a non-limiting schematic illustration of a slurry mixing system 10 including a water line 12, a first additive chamber 14, a second additive chamber 16, and a third additive chamber 18. When the water and the additives are mixed together the result is a mixing fluid or slurry 20. Along the path at a convenient location, a Capillary Electrophoresis (CE) unit 22 is positioned. The CE unit is configured to apply CE techniques to analyze characteristics of the mix 20. The CE unit can be configured to determine the presence and quantity of the various additives being introduced to the mix 20 from the tanks 14, 16 and 18. The CE unit 22 may also monitor the quality of water in the line 12 by determining different ions present in water, which could ultimately determine the performance of different additives from the additive tanks 14, 16 and 18. The mixing fluid may be then transferred to Tank 1 23 or Tank 2 24. CE units may be positioned inside Tank 1 and Tank 2. Both Tank 1 and Tank 2 are fluidly connected to a cement mixing unit 25. Another CE unit may be installed in the line between Tank 1 and Tank 2 and the cement mixing unit.

FIG. 1 also shows a graph 26 of the detected presence of the additives over time. There are three lines representing additives A, B, and C. In this instance, the line representing additive B begins a sharp decline at which point the line slopes downward suggesting a problem with the second tank 16 providing additive B to the mix 20.

Figure 2:
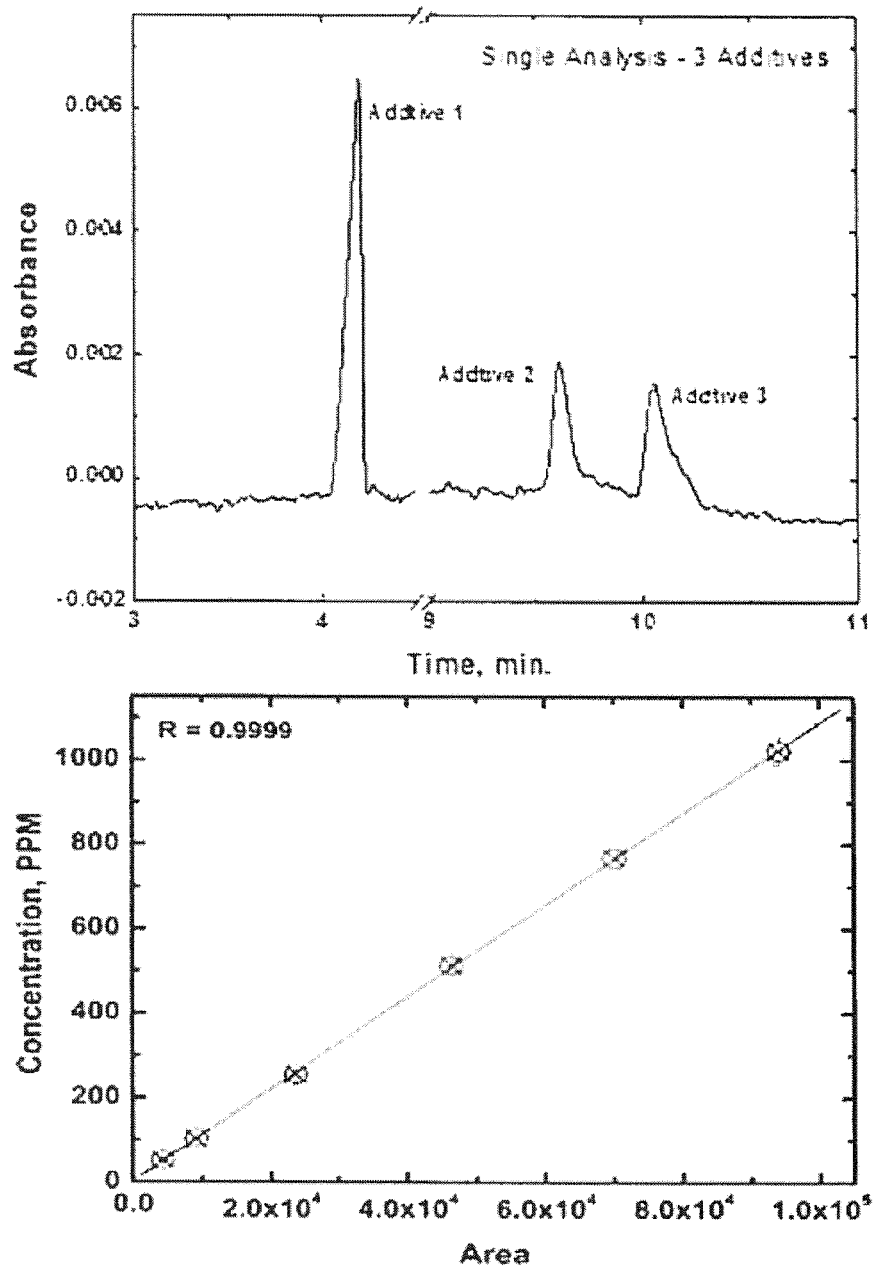
FIG. 2 is a capillary electrophoresis trace showing the analysis of three additives. The figure also includes a calibration plot showing that the concentration determination is a linear function.

FIG. 2 shows a typical CE analysis trace of a blend of additives. In this instance the data present in FIG. 2 were obtained with the same CE protocol. It highlights that different cement additives (single-component or multi-components) can be detected very accurately. Furthermore, for each of them, retention time is different. It is therefore possible to determine the concentration of each additive in the mix-fluid prepared on the rig.

FIG. 2 also presents the calibration plot for one common additive. This not only indicates that the concentration can be monitored but also that deviations outside the "delivery" tolerance will be effectively indicated by examination of the blend composition when all set points are constant. The embodiments disclosed herein highlight the advantages and applicability of analytical techniques such as CE for analysis of different types of additives for key components. By selecting appropriate constituents this is the first disclosed method that can monitor a cementing operation by concentrating solely on the composition of the species present in the mix and using one single method.

Figure 3:
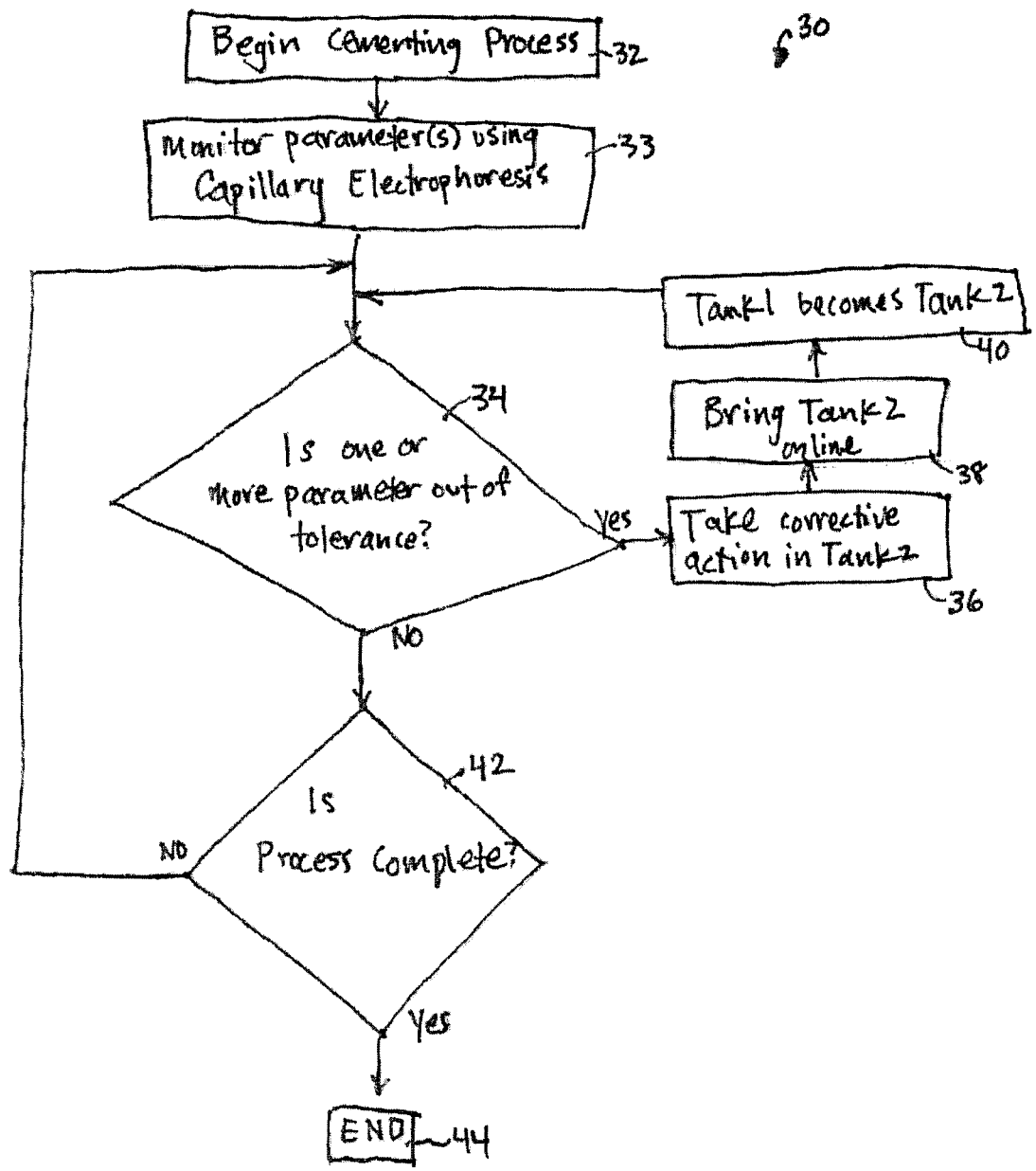
FIG. 3 is a flowchart that illustrates the sequence of events that takes place during the disclosed cementing operations.

FIG. 3 is a flow chart showing methods according to the present disclosure. A method 30 for monitoring, diagnosing, and correcting a parameter in a cementing operation is shown. First the cementing operation begins at 32. During the cementing operation, one or more parameters is monitored at 33 using the Capillary Electrophoresis (CE) technique. The monitoring can be performed using another equivalent technique within the scope of this disclosure. The parameters being monitored may be any number of additives or components of the cement or any other material added to the cement during the cementing operation added to the cement before the operation begins. The method also includes determining periodically or continuously at 34 whether or not one or more parameters are outside the range of tolerance.

Once a parameter falls outside the tolerance range, the method continues at 36 by taking corrective action. If a pump failure occurs, the correcting operation may comprise stopping the operation, repairing or replacing the pump, and resuming the operation. Or, if for example the pump failure occurs in the first tank, mixing fluid can be drawn from the second tank and the operation may be continued while repairing or replacing the pump in the first tank. The corrective operation may comprise changing from the first tank to the second tank, or vice versa. The corrective action may comprise adjusting a pump rate at which the mixing fluid is mixed with the cement. The nature of the corrective action depends upon the cementing operation and the character of the additive.

The method continues by bringing Tank 2 online at 38. In some embodiments, this is done by ceasing use of Tank 1 and instead using Tank 2 which includes the corrected materials. Tank 2 then becomes the source of the material or additive as the situation demands. At 40, Tank 1 becomes Tank 2 and can be emptied, altered, or otherwise addressed so this tank is now the standby tank. If another deviation from tolerance is detected at 34, the process can repeat and what was first Tank 1 is now Tank 2 for a second round of remedial action. The method can continue until the process is complete as checked at 42. If complete, the process ends at 44. It is envisioned that more than two tanks may be present in the mixing system.

Embodiments of the present disclosure can be ported directly onto a cement pumping unit or on a rig where pumping units are available for cement operation. Automatic detection, analysis and mitigation of the problems are based on an easy-human interface. One advantage of this approach is that it uses the analytical signal to further perform diagnostics on the mixing and pumping rig while performing the cementing job. The deviation of the measured signal from the desired value for a given pump unit/tank can be used to regulate the dosage while the job is performed. However, the recorded deviation also indicates that this unit will need maintenance. Other pumps with constant dosage throughout the job may require minimal maintenance after the job.

Embodiments of the present disclosure may also build on these techniques by using the individual signals to monitor the performance of the individual parts of the mixer system. Repeated signal deviations may indicate that hardware is worn or calibration is off. This will reduce maintenance cost by reducing the need for unnecessary work-over on units between cementing jobs.

Embodiments of the present disclosure are directed to quality control of cement additives, mix-fluid and cement slurries. The output from the compositional analysis of the mix and the individual additives is used to monitor the performance of individual mechanical parts of the mixer systems such as pumps, controls etc. Deviation from set point can indicate if parts need to be replaced or recalibrated.

Embodiments of the present disclosure are directed to an automated quality control system providing fault detection and remedial action by sampling the mix fluid, and analyze the additive and/or cement slurry concentration through a CE laboratory device or any other portable analytical device and using the information for diagnostics on the individual parts of the mixing process used.

Previously disclosed CE methods are aimed at both additive mix quality control and pump control. Embodiments of the present disclosure are directed to applying the CE information to observe set-point deviations caused by mechanical or sensor failure leading to changes in flow from individual tanks to the mixing unit. It applies all the previous points of initiating the CE and optimization and calibration procedures mentioned.

Embodiments of the present disclosure are directed to methods for using an automated diagnostic tool on the cementing additive blending unit based on the use of analytical data obtained from while monitoring the blend composition. This can significantly reduce the need and cost of off-site maintenance and workover and allows for use of back-up dispensing tank units if problem occur during a job.

The present methods based on CE may ideally be performed without the use of tracers. CE detects signal deviations derived from the additives themselves. However, if an additive does not contain a substance detectable by CE, a UV-vis absorbing tracer may be added.

During maintenance work over the operation and performance (calibration etc.) of pumps and other crucial part of the mixer unit can also be monitored by using tracer mixtures added to the individual tanks and pumped through the system to monitor. Deviation outside given tolerances indicates which parts should be recalibrated, renovated or replaced.

Based on the significance of each additive on the well fluid properties, the operator may choose to determine the concentrations of all additives or only one or a limited number of the additives present in the fluid, and the concentrations can be adjusted as needed to reach the desired target concentration(s). Though CE offers simple measurements or technique to analyze different chemistries of cement additives, some time may be required for the operator to determine the quality of the individual additives, final mix-fluid and slurry quality.

As is well known in the art, the cement may be Portland cement, high alumina cement, lime/silica mixtures, pozzolans, cement kiln dust, geopolymers, Sorel cement or chemically bonded phosphate ceramics.

A method for performing a cementing operation at a well site comprises providing a liquid additive mixing apparatus that comprises a plurality of chambers containing additives, and further comprises a system for mixing the additives. At least one additive is mixed with water to form a mixing fluid. The mixing fluid is placed in a first tank that is fluidly connected to a cement mixing unit. A cementing operation is executed by mixing the mixing fluid with a cement to form a slurry at the cement mixing unit. A capillary electrophoresis instrument is used to monitor at least one additive parameter and detect deviations from a predetermined tolerance for the at least one additive parameter. If deviations are detected, corrective action is taken to return the at least one additive parameter to the predetermined tolerance.

The corrective action may comprise ceasing to draw mixing fluid from the first tank, placing the mixing fluid in a second tank that is fluidly connected to the cement mixing unit, and continuing the cementing operation while drawing mixing fluid from the second tank.

If a pump failure occurs, the corrective action may comprise stopping the operation, repairing and replacing the pump, and resuming the operation; or, if the pump failure occurs in the first tank, one may change from the first tank to the second tank. The operation may continue while repairing or replacing the pump in the first tank.

The corrective action may comprise changing from the first tank to the second tank, or vice versa. The corrective action may comprise adjusting a pump rate at which the mixing fluid is mixed with the cement. The corrective action may comprise adjusting one or more additive concentrations in the mixing fluid.

A water line may be present in the mixing apparatus, thereby allowing a concentration adjustment of the one or more additives.

The method may further comprise filling the second tank with mixing fluid while mixing fluid from the first tank is being mixed with the cement. When the first tank is exhausted, fluid from the second tank is then mixed with the cement. The first tank is then filled with mixing fluid while the second tank is in use. When the second tank is exhausted, fluid from the first tank is then mixed with the cement. This alternating procedure may continue until the cementing operation is complete.

At least one of the additives may be soluble in the mixing fluid. The at least one additive may comprise an anti-foamer, a defoamer, a dispersant, an accelerator, a retarder, a fluid-loss additive, a gas migration additive, a corrosion inhibitor, an acid, a gelling agent, a crosslinker, a breaker, or a surfactant or combinations thereof.

A method for monitoring at least one parameter pertaining to a cementing operation comprises providing a liquid additive mixing apparatus that comprises a plurality of chambers containing additives, and further comprises a system for mixing the additives. At least one additive is mixed with water to form a mixing fluid. The mixing fluid is placed in a first tank that is fluidly connected to a cement mixing unit. A cementing operation is executed by continuously mixing the mixing fluid with a cement to form a slurry at the cement mixing unit. A capillary electrophoresis instrument is used to monitor at least one additive parameter and detect deviations from a predetermined tolerance for the at least one additive parameter.

At least one of the additives may be soluble in the mixing fluid, and the cementing operation may be continuous.

The at least one additive may comprise an anti-foamer, a defoamer, a dispersant, an accelerator, a retarder, a fluid-loss additive, a gas migration additive, a corrosion inhibitor, an acid, a gelling agent, a crosslinker, a breaker, or a surfactant or combinations thereof.

A system for performing a cementing operation may comprise a liquid additive mixing apparatus that comprises a plurality of chambers containing additives, and further comprises a system for mixing the additives to form a mixing fluid. The system further comprises a first tank and a second tank that are fluidly connected to the liquid additive mixing apparatus and a cement mixing unit. The system also comprises a capillary electrophoresis (CE) instrument.

The mixing fluid is mixed with the cement to form a slurry. A CE instrument may monitor at least one additive parameter and detect deviations from a predetermined tolerance for the at least one parameter.

The first tank may be replenished with mixing fluid while the second tank is being used, and vice versa. The system may further comprise a water line, and at least one of the additives may be soluble in the mixing fluid.

The at least one additive may comprise an anti-foamer, a defoamer, a dispersant, an accelerator, a retarder, a fluid-loss additive, a gas migration additive, a corrosion inhibitor, an acid, a gelling agent, a crosslinker, a breaker, or a surfactant or combinations thereof.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A method for performing a cementing operation at a well site, comprising:
   providing a liquid additive mixing apparatus that comprises a plurality of chambers containing additives, and further comprises a system for mixing the additives;
   using the system for mixing the additives, mixing at least one additive with water to form a mixing fluid;
   placing the mixing fluid in a tank;
   executing the cementing operation by mixing the mixing fluid with a cement to form a slurry using a cement mixing unit;
   using a capillary electrophoresis (CE) instrument to monitor at least one additive parameter in the tank, wherein the tank is fluidly connected to the liquid additive mixing apparatus and the cement mixing unit, and wherein the CE instrument is disposed in the tank;
   detecting at least one deviation from a predetermined tolerance for the at least one additive parameter using the CE instrument; and
   taking corrective action to return the at least one additive parameter to the predetermined tolerance.

2. The method of claim 1, wherein:
   the tank is a first tank,
   placing the mixing fluid in the first tank comprises placing a first quantity of the mixing fluid in the first tank, and the corrective action comprises:
    ceasing to draw the mixing fluid from the first tank,
    placing a second quantity of the mixing fluid in a second tank that is fluidly connected to the cement mixing unit, and
    continuing the cementing operation while drawing the mixing fluid from the second tank.

3. The method of claim 1, wherein the tank is a first tank, and if a pump failure occurs, the corrective action comprises:
    stopping the cementing operation, repairing or replacing the pump, and resuming the operation; or
    if the pump failure occurs in the first tank, changing from the first tank to a second tank and continuing the cementing operation while repairing or replacing the pump in the first tank, or vice versa.

4. The method of claim 1, wherein the tank is a first tank, and the corrective action comprises changing from the first tank to a second tank, or vice versa.

5. The method of claim 1, wherein the corrective action comprises adjusting a pump rate at which the mixing fluid is mixed with the cement.

6. The method of claim 1, wherein the corrective action comprises adjusting one or more additive concentrations in the mixing fluid.

7. The method of claim 6, wherein the system for mixing the additives comprises a water line for forming the mixing fluid.

8. The method of claim 1, wherein the tank is a first tank, and further comprising:
    filling a second tank with the mixing fluid while the mixing fluid from the first tank is being mixed with the cement, wherein the second tank is fluidly connected to the cement mixing unit;
    drawing the mixing fluid from the second tank when the first tank is exhausted;
    filling the first tank with the mixing fluid while the mixing fluid from the second tank is being mixed with the cement;
    drawing the mixing fluid from the first tank when the second tank is exhausted; and
    continuing to alternate between the first and second tanks until the cementing operation is complete.

9. The method of claim 1, wherein the at least one additive is soluble in the mixing fluid.

10. The method of claim 1, wherein the at least one additive comprises an anti-foamer, a defoamer, a dispersant, an accelerator, a retarder, a fluid-loss additive, a gas migration additive, a corrosion inhibitor, an acid, a gelling agent, a crosslinker, a breaker, or a surfactant or combinations thereof.

11. A method for monitoring at least one parameter pertaining to a cementing operation, comprising:
    providing a liquid additive mixing apparatus that comprises a plurality of chambers containing additives and a system for mixing the additives;
    using the system for mixing the additives, mixing at least one additive with water to form a mixing fluid;
    placing the mixing fluid in a tank that is fluidly connected to a cement mixing unit;
    executing the cementing operation by continuously mixing the mixing fluid with a cement to form a slurry using the cement mixing unit; and
    using a capillary electrophoresis (CE) instrument to monitor at least one additive parameter in the mixing fluid and detect deviations from a predetermined tolerance for the at least one additive parameter, and wherein the CE instrument is disposed in the tank.

12. The method of claim 11, wherein the at least one additive is soluble in the mixing fluid.

13. The method of claim 11, wherein the at least one additive comprises an anti-foamer, a defoamer, a dispersant, an accelerator, a retarder, a fluid-loss additive, a gas migration additive, a corrosion inhibitor, an acid, a gelling agent, a crosslinker, a breaker, or a surfactant or combinations thereof.

14. A system for performing a cementing operation, comprising:
    a liquid additive mixing apparatus that comprises a plurality of chambers containing additives, and further comprises a system operable to mix at least one additive with water to form a mixing fluid;
    a first tank that is fluidly connected to the liquid additive mixing apparatus and a cement mixing unit;
    a second tank that is fluidly connected to the liquid additive mixing apparatus and the cement mixing unit; and
    a capillary electrophoresis (CE) instrument operable to monitor at least one additive parameter and to detect at least one deviation from a predetermined tolerance for the at least one additive parameter, wherein the CE instrument is disposed in the first tank, and wherein the CE instrument is fluidly connected to the first tank, the second tank, or both.

15. The system of claim 14, further comprising the cement mixing unit, wherein the cement mixing unit is operable to mix the mixing fluid with cement to form a slurry.

16. The system of claim 14, further comprising a water line fluidly connected to the liquid additive mixing apparatus, the first tank, and the second tank.

17. The system of claim 14, wherein the at least one additive is soluble in the mixing fluid.

18. The system of claim 14, wherein the at least one additive comprises an anti-foamer, a defoamer, a dispersant, an accelerator, a retarder, a fluid-loss additive, a gas migration additive, a corrosion inhibitor, an acid, a gelling agent, a crosslinker, a breaker, or a surfactant or combinations thereof.

* * * * *